United States Patent
Shan et al.

(10) Patent No.: US 11,967,015 B2
(45) Date of Patent: Apr. 23, 2024

(54) NEURAL RENDERING

(71) Applicant: Apple Inc., Cupertino, CA (US)

(72) Inventors: Qi Shan, Seattle, WA (US); Joshua Susskind, San Jose, CA (US); Aditya Sankar, Seattle, WA (US); Robert Alex Colburn, Seattle, WA (US); Emilien Dupont, Seattle, WA (US); Miguel Angel Bautista Martin, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/145,232

(22) Filed: Jan. 8, 2021

(65) Prior Publication Data
US 2021/0248811 A1    Aug. 12, 2021

Related U.S. Application Data

(60) Provisional application No. 63/018,434, filed on Apr. 30, 2020, provisional application No. 62/971,198, filed on Feb. 6, 2020.

(51) Int. Cl.
G06T 15/20 (2011.01)
G06N 3/08 (2023.01)
G06T 3/60 (2006.01)

(52) U.S. Cl.
CPC ............ *G06T 15/205* (2013.01); *G06N 3/08* (2013.01); *G06T 3/60* (2013.01)

(58) Field of Classification Search
CPC ......... G06T 15/205; G06T 3/60; G06T 19/20; G06T 15/20; G06T 2219/016;
(Continued)

(56) References Cited

U.S. PATENT DOCUMENTS

2013/0156297 A1    6/2013  Shotton et al.
2018/0150726 A1    5/2018  Gorban
(Continued)

FOREIGN PATENT DOCUMENTS

CN    102930302 A    2/2013
CN    108230277 A    6/2018
(Continued)

OTHER PUBLICATIONS

Toffoli et al., "Three-Dimensional Rotations by Three Shears", vol. 59, Issue 2, Mar. 1997, pp. 89-95, "https://www.sciencedirect.com/science/article/pii/S1077316997904202#!".*
(Continued)

*Primary Examiner* — Xilin Guo
(74) *Attorney, Agent, or Firm* — BAKERHOSTETLER

(57) ABSTRACT

The subject technology provides a framework for learning neural scene representations directly from images, without three-dimensional (3D) supervision, by a machine-learning model. In the disclosed systems and methods, 3D structure can be imposed by ensuring that the learned representation transforms like a real 3D scene. For example, a loss function can be provided which enforces equivariance of the scene representation with respect to 3D rotations. Because naive tensor rotations may not be used to define models that are equivariant with respect to 3D rotations, a new operation called an invertible shear rotation is disclosed, which has the desired equivariance property. In some implementations, the model can be used to generate a 3D representation, such as mesh, of an object from an image of the object.

21 Claims, 10 Drawing Sheets

(58) Field of Classification Search
CPC . G06T 2207/20084; G06T 2207/20081; G06T 7/60; G06T 17/10; G06T 3/4046; G06T 7/70; G06T 15/00; G06T 7/50; G06T 7/11; G06N 3/08; G06N 20/00; G06N 3/0454; G06N 3/02; G06N 3/045; G06V 10/82

See application file for complete search history.

(56) References Cited

U.S. PATENT DOCUMENTS

| | | | |
|---|---|---|---|
| 2018/0234671 A1* | 8/2018 | Yang | H04N 13/161 |
| 2019/0026917 A1* | 1/2019 | Liao | G06T 7/73 |
| 2021/0103776 A1* | 4/2021 | Jiang | G06K 9/6232 |
| 2021/0327127 A1* | 10/2021 | Hinterstoisser | G06T 3/40 |

FOREIGN PATENT DOCUMENTS

| | | |
|---|---|---|
| CN | 109191255 A | 1/2019 |
| WO | WO 2017/142397 | 8/2017 |

OTHER PUBLICATIONS

Di Bella et al ("A comparison of rotation-based methods for iterative reconstruction algorithms" IEEE Transactions on Nuclear Science ( vol. 43, Issue: 6, Dec. 1996); pp. 3370-3376; https://ieeexplore.ieee.org/document/552756.*
Yim et al ("Rotating Your Face Using Multi-task Deep Neural Network", IEEE Conference on Computer Vision and Pattern Recognition (CVPR), 2015, pp. 676-684); https://openaccess.thecvf.com/content_cvpr_2015/html/Yim_Rotating_Your_Face_2015_CVPR_paper.html.*
Chang, et al. "ShapeNet: An Information-Rich 3D Model Repository," 2015, retrieved from https://arxiv.org/pdf/1512.03012v1.pdf, 11 pages.
Chen, et al., "Monocular Neural Image Based Rendering with Continuous View Control," IEEE International Conference on Computer Vision (ICCV), Oct. 2019, 11 pages.
Cohen, et al., "Group Equivariant Convolutional Networks," Proceedings of The 33rd International Conference on Machine Learning, vol. 48, pp. 2990-2999, Jun. 2016, http://proceedings.mlr.press/v48/cohenc16.html.
Cohen, et al., "Steerable CNNs," Proceedings of the International Conference on Learning Representations, 2016, 10 pages.
Curless, et al., "A Volumetric Method for Building Complex Models from Range Images," Proceedings of the 23rd Annual Conference on Computer Graphics and Interactive Techniques, SIGGRAPH '96, pp. 303-312.
Eslami, et al., "Neural scene representation and rendering," Science, 2018, vol. 360, pp. 1204-1210.
Esteves, et al., "Learning SO(3) Equivariant Representations with Spherical CNNs," 2017, retrieved from http://arxiv.org/abs/1711.06721, 17 pages.
Hedman, et al., "Scalable Inside-Out Image-Based Rendering," ACM Transactions on Graphics, 2016, vol. 35, 2016, 11 pages.
Hedman, et al., "Deep Blending for Free-Viewpoint Image-Based Rendering," ACM Transactions on Graphics, 2018, vol. 37, 2018, 15 pages.
Insafutdinov, et al., "Unsupervised Learning of Shape and Pose with Differentiable Point Clouds," Advances in neural information processing systems, 2018, 16 pages.
Jack, et al., "Learning Free-Form Deformations for 3D Object Reconstruction," Asian Conference on Computer Vision, 2018, pp. 317-333.
Jakob, W. Mitsuba renderer, 2010. http://www.mitsubarenderer.org., 3 pages.
Lenssen, et al., "Group Equivariant Capsule Networks," Advances in Neural Information Processing Systems 31, pp. 8844-8853, 2018, retrieved from http://papers.nips.cc/paper/8100-group-equivariant-capsule-networks.pdf, 10 pages.
Maas, et al., "Rectifier Nonlinearities Improve Neural Network Acoustic Models," 2013, retrieved from http://ai.stanford.cdu/~amaas/papers/relu_hybrid_icml2013_final.pdf, 6 pages.
Maturana, et al., "VoxNet: A 3dD Convolutional Neural Network for Real-Time Object Recognition," 2015, IEEE/RSJ International Conference on Intelligent Robots and Systems (IROS), pp. 922-928.
Mescheder, et al., "Occupancy Networks: Learning 3D Reconstruction in Function Space," 2018, 11 pages.
Newcombe, et al., "KinectFusion: Real-Time Dense Surface Mapping and Tracking," ISMAR, 2011, vol. 11, pp. 127-136.
Nguyen-Phuoc, et al., "HoloGAN: Unsupervised Learning of 3d Representations From Natural Images," 2019, retrieved from https://openaccess.thecvf.com/content_ICCV_2019/papers/Nguyen-Phuoc_HoloGAN_Unsupervised_Learning_of_3D_Representations_From_Natural_Images_ICCV_2019_paper.pdf, 10 pages.
Nguyen-Phuoc, et al., "RenderNet: A deep convolutional network for differentiable rendering from 3D shapes," Advances in Neural Information Processing Systems, 2018, pp. 7891-7901.
Nießner, et al., "Real-Time 3D Reconstruction at Scale Using Voxel Hashing," ACM Transactions on Graphics (ToG), 2013, 32(6):169.
Paeth, "A Fast Algorithm for General Raster Rotation," Proceedings on Graphics Interface'86/Vision Interface'86, 1986, pp. 77-81.
Park, et al., "DeepSDF: Learning Continuous Signed Distance Functions for Shape Representation," CoRR, 2019, 19 pages.
Qi, et al., "Pointnet: Deep Learning on Point Sets for 3D Classification and Segmentation," Proceedings of the IEEE conference on computer vision and pattern recognition, 2017, pp. 652-660.
Shi, "Mitsuba for shapenet," 2014, https://github.com/shijian/mitsuba-shapenet, 3 pages.
Sitzmann, et al., "DeepVoxels: Learning Persistent 3D Feature Embeddings," IEEE Conference on Computer Vision and Pattern Recognition (CVPR), Jun. 2019, 10 pages.
Sitzmann, et al., "Scene Representation Networks: Continuous 3D-Structure-Aware Neural Scene Representations," 2019, retrieved from https://arxiv.org/pdf/1906.01618.pdf, 23 pages.
Sun, et al., "Multi-View to Novel View: Synthesizing Novel Views with Self-Learned Confidence," Proceedings of the European Conference on Computer Vision (ECCV), 2018, pp. 155-171.
Tatarchenko, et al., "Multi-View 3D Models from Single Images with a Convolutional Network," European Conference on Computer Vision, 2016, pp. 322-337.
Tatarchenko, et al., "What Do Single-View 3D Reconstruction Networks Learn?" Proceedings of the IEEE Conference on Computer Vision and Pattern Recognition, 2019, pp. 3405-3414.
Thies, et al., "IGNOR: Image-guided Neural Object Rendering," 2018, retrieved from https://arxiv.org/pdf/1811.10720v1.pdf, 10 pages.
Thies, et al., "Deferred Neural Rendering: Image Synthesis using Neural Textures," SIGGRAPH, 2019, 12 pages.
Tobin, et al., "Geometry-Aware Neural Rendering," Advances in Neural Information Processing Systems 32, pp. 11555-11565. Curran Associates, Inc., 2019, http://papers.nips.cc/paper/9331-geometry-aware-neural-rendering.pdf, 11 pages.
Wang, et al., "DISN: Deep Implicit Surface Network for High-quality Single-view 3D Reconstruction," 2019, retrieved from https://papers.nips.cc/paper/2019/file/39059724f73a9969845dfe4146c5660e-Paper.pdf, 11 pages.
Worrall, et al., "Interpretable Transformations with Encoder-Decoder Networks," Proceedings of the IEEE International Conference on Computer Vision, 2017, pp. 5726-5735.
Wu, et al., "Group Normalization," Proceedings of the European Conference on Computer Vision (ECCV), 2018, pp. 3-19.
Xu, et al., "Dcc36cp View Synthesis frc37om Sparsc Photometric Images," 2019 ACM Transactions on Graphics, 2019, vol. 38, No. 4, Article 76, 13 pages.
Zhou, et al., "View Synthesis by Appearance Flow," European conference on computer vision, 2016, 16 pages.
Zhu, et al., "Visual Object Networks: Image Generation with Disentangled 3D Representations," 32nd Conference on Neural Information Processing Systems, 2018, 12 pages.
Dupont et al., "Equivariant Neural Rendering," Arxiv.org, Cornell University Library, Dec. 2020, 14 pages.

(56) References Cited

OTHER PUBLICATIONS

Olszewski, et al., "Transformable Bottleneck Networks," 2019 IEEE International Conference on Computer Vision, Oct. 2019, pp. 7647-7656.
Schroder et al., "Fast rotation of volume data on parallel architectures," IEEE Conference on Visualization, Oct. 1991, pp. 50-57.
International Search Report and Written Opinion from PCT/US2021/013073, dated Aug. 18, 2021, 22 pages.
Invitation to Pay Additional Fees from PCT/US2021/013073, dated Jun. 25, 2021, 18 pages.
International Preliminary Report on Patentability from PCT/US2021/013073, dated May 16, 2022, 23 pages.
European Office Action from European Patent Application No. 21704078.1, dated Jun. 12, 2023, 12 pages.
European Office Action from European Patent Application No. 21704078.1, dated Dec. 14, 2023, 9 pages.
Chinese Office Action from 202110156872.7, dated Jan. 9, 2024, 15 pages including machine-generated English language translation.

\* cited by examiner

NEURAL RENDERING

CROSS REFERENCE TO RELATED APPLICATIONS

This application claims the benefit of priority to U.S. Provisional Patent Application No. 62/971,198, entitled "Neural Rendering," filed on Feb. 6, 2020 and U.S. Provisional Patent Application No. 63/018,434, entitled "Neural Rendering," filed on Apr. 30, 2020, the disclosure each of which is hereby incorporated herein in its entirety.

TECHNICAL FIELD

The present description generally relates to developing machine learning applications.

BACKGROUND

Software engineers and scientists have been using computer hardware for machine learning to make improvements across different industry applications including neural rendering.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
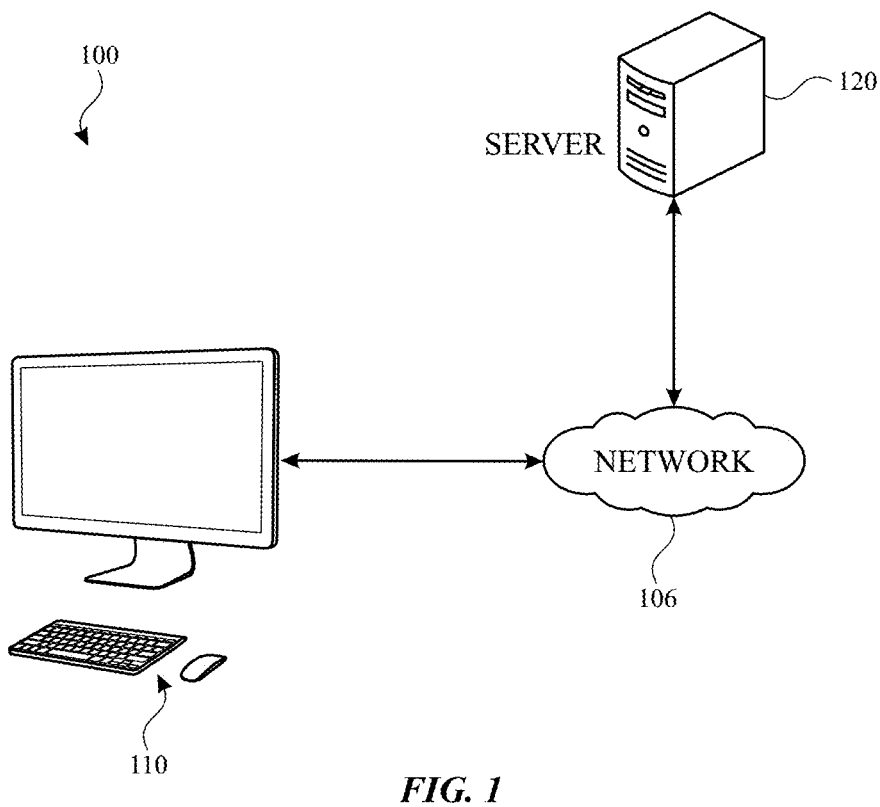
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize models that are executed to provide predictions in particular applications (e.g., analyzing images and videos, object detection and/or tracking, etc.) among many other types of applications.

For example, neural rendering approaches produce photorealistic renderings given noisy or incomplete 3D or 2D observations. For example, incomplete 3D inputs have been converted to rich scene representations using neural textures, which fill in and regularize noisy measurements. However, conventional methods for neural rendering either require 3D information during training, complicated rendering priors, or expensive runtime decoding schemes.

The subject technology provides techniques for training a machine learning model to extract three-dimensional information from a two-dimensional image. For example, the machine learning model may be trained to render an output image of an object based on an input image of the object, the output image depicting a different view of the object than is depicted in the input image. In one illustrative example, based on a two-dimensional input image depicting a view of a mug from above the mug and on a left side of a handle of the mug, the trained machine learning model can provide an output image of the same mug as it would be viewed from the bottom of the mug, from the right side of the mug, or from any other view of the mug in three dimensions. The trained machine learning model can generate these output images even though the input image does not contain depth information for the mug, and even though the machine learning model is not provided with any depth information regarding the input image.

The subject technology does not require expensive sequential decoding steps and enforces 3D structure through equivariance. The subject technology can be trained using only images and their relative poses, and can therefore extend more readily to real scenes with minimal assumptions about geometry.

Traditional neural networks may not be equivariant with respect to general transformation groups. Equivariance for discrete rotations can be achieved by replicating and rotating filters. In the present disclosure, neural networks that achieve equivariance are provided by treating a latent representation as a geometric 3D data structure and applying rotations directly to this representation. Traditional scene representations (e.g., explicit representations such as point clouds, voxel grids, and meshes) may not scale well due to memory and compute requirements. Thus, in the present disclosure, an implicit neural representation is encoded into a latent 3D tensor.

In contrast with the subject technology, neural rendering using flow estimation for view synthesis predicts a flow field over the input image(s) conditioned on a camera viewpoint transformation. These approaches model a free-form deformation in image space and, as a result, may not be able to explicitly enforce equivariance with respect to 3D rotation. In addition, these models are commonly restricted to segmented single objects, not entire scenes.

Returning to the example above of an input image of a mug, in some implementations of the subject technology, the machine learning model may be trained to output an explicit representation of the mug in three dimensions in addition to, or in place of, a two-dimensional output image of the mug. An explicit representation of the mug in three dimensions can be a point cloud, a mesh, or a voxel grid (as examples) that can be rendered so as to be recognizable as the object to a human viewer, and that can be manipulated (e.g., rotated, translated, re-sized, etc.) in three dimensions.

Implementations of the subject technology improve the computing functionality of a given electronic device by providing an equivariance constraint that, when applied during training of a machine learning model, allows the model to be (i) trained without 3D supervision, (ii) tested without providing pose information as input to the model, and/or (iii) operated to generate an implicit representation (also referred to herein as a "scene representation") of a three-dimensional object from a single two-dimensional image of the object in a single forward pass. Prior approaches may require an expensive optimization procedure to extract three-dimensional information from an image or a set of images, and typically may require 3D supervision and/or input pose information during training and/or at runtime. The subject technology avoids this by providing the equivariance constraint that merely enforces that an implicit representation generated by the model based on an input image is equivariant (e.g., under rotations, translations, and/or scaling) with the three-dimensional object itself (e.g., under the same rotations, translations, and/or scaling). These benefits therefore are understood as improving the computing functionality of a given electronic device, such as an end user device which may generally have less computational and/or power resources available than, e.g., one or more cloud-based servers.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a mobile electronic device (e.g., smartphone). The electronic device 110 may be, and/or may include all or part of, the electronic system discussed below with respect to FIG. 3.

In one or more implementations, the electronic device 110 may provide a system for training a machine learning model using training data, where the trained machine learning model is subsequently deployed to the electronic device 110. Further, the electronic device 110 may provide one or more machine learning frameworks for training machine learning models and/or developing applications using such machine learning models. In an example, such machine learning frameworks can provide various machine learning algorithms and models for different problem domains in machine learning. In an example, the electronic device 110 may include a deployed machine learning model that provides an output of data corresponding to a prediction or some other type of machine learning output.

The server 120 may provide a system for training a machine learning model using training data, where the trained machine learning model is subsequently deployed to the server 120. In an implementation, the server 120 may train a given machine learning model for deployment to a client electronic device (e.g., the electronic device 110). The machine learning model deployed on the server 120 and/or the electronic device 110 can then perform one or more machine learning algorithms. In an implementation, the server 120 provides a cloud service that utilizes the trained machine learning model and continually learns over time.

Figure 2:
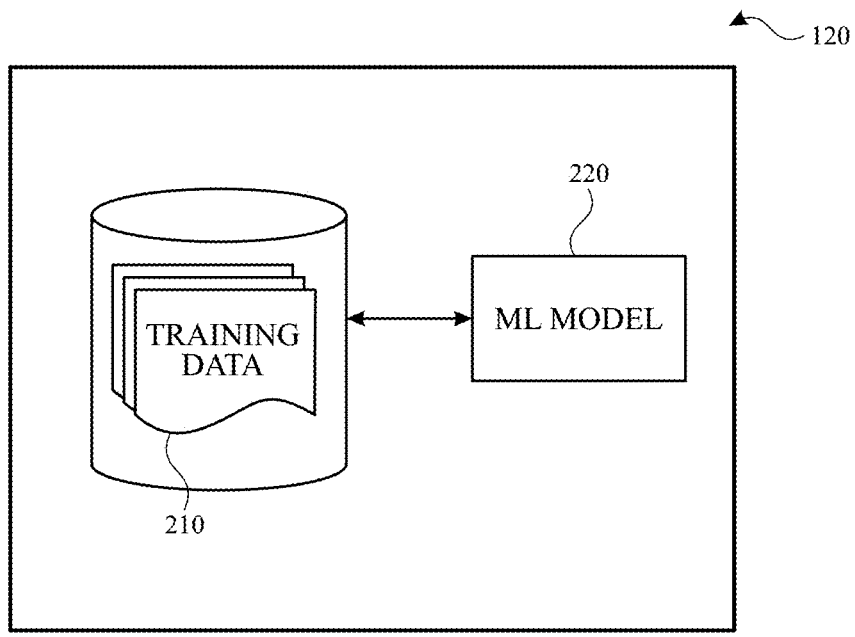
FIG. 2 illustrates an example computing architecture for a system providing machine learning models trained based on equivariance in accordance with one or more implementations.

FIG. 2 illustrates an example computing architecture for a system providing an equivariance constraint for machine learning models, in accordance with one or more implementations. For explanatory purposes, the computing architecture is described as being provided by the server 120, such as by a processor and/or memory of the server 120; however, the computing architecture may be implemented by any other electronic devices, such as the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the server 120 includes training data 210 for training a machine learning model. In an example, the server 120 may utilize one or more machine learning algorithms that uses training data 210 for training a machine learning (ML) model 220. ML model 220 may be trained based on at least two training images in training data 210, the two training images depicting different views of a training object. ML model 220 may be trained using an equivariance constraint. The equivariance constraint may enforce an equivariance (e.g., under rotations, translations, and/or scaling) between an implicit representation of the training object and the training object itself.

Training data 210 may include two-dimensional images of various objects, each image depicting one or more of the objects from a particular view. The images may include sets of images of a particular object from various views that are rotated, translated, scaled, and/or otherwise different relative to the views depicted in the other image(s) of the particular object.

Figure 3:
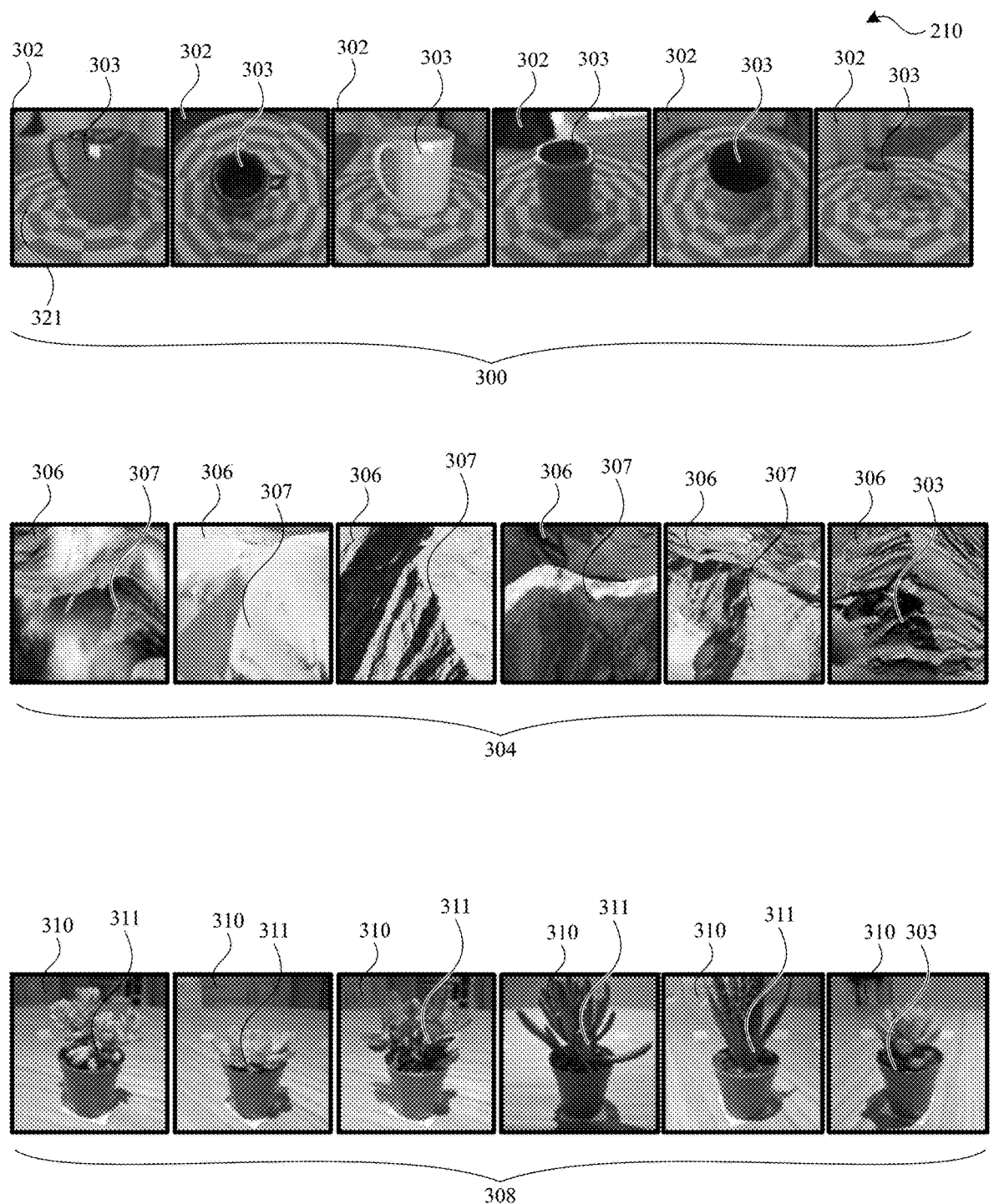
FIG. 3 illustrates various input images that can be provided to machine learning models trained based on equivariance in accordance with one or more implementations.

For example, FIG. 3 illustrates several sets of example training images that can be used for training ML model 220. Neural rendering and scene representation models are usually tested and benchmarked on a ShapeNet dataset. However, the images produced from this ShapeNet dataset are often very different from real scenes: they are rendered on empty backgrounds and only involve fixed, rigid objects. As ML model 220 does not rely on 3D supervision, ML model 220 can be trained on rich data for which it can be very expensive or difficult to obtain 3D ground truths. Training data 210 may include three new datasets of posed images which can be used to train and/or test models with complex visual effects. The first dataset, referred to herein as MugsHQ, is composed of photorealistic renders of colored mugs on a table with an ambient background. The second dataset, referred to herein as the 3D mountains dataset, contains renders of more than five hundred mountains in the Alps using satellite and topography data. The third dataset contains real images of succulents in an indoor scene. In accordance with various aspects, the subject technology provides three new challenging datasets to test representations and neural rendering for complex, natural scenes, and show compelling rendering results on each, highlighting the versatility of the disclosed systems and methods.

In the example of FIG. 3, training data 210 includes a first set of training images 300, a second set of training images 304, and a third set of training images 308. The first set of training images 300 in this example includes multiple images 302, each including a particular view of a particular training object 303 (e.g., a mug). Training data 210 may include several training images 300, from several views, of each of several mugs.

The first set of training images 300 may be referred to as the MugsHQ dataset and may be based on the mugs class from the ShapeNet dataset. In the example of FIG. 3, instead of rendering images on a blank background, every scene is rendered with an environment map (e.g., lighting conditions) and a checkerboard disk platform 321. The first set of training images 300 may include, for example, for each of two hundred fourteen mugs, one hundred and fifty viewpoints uniformly over the upper hemisphere. In this example, the environment map and disk platform is the same for every mug. In this way, the scenes in each of the images 302 of the first set of training images 300 are much more complex and look more realistic than typical ShapeNet renders.

While the MugsHQ dataset (e.g., first set of training images 300) contains photorealistic renders and complex background and lighting, the background scene is the same for every object. ML model 220 can also be trained and/or tested using the second set of training images 304, in which the depicted training objects 307 are mountains. The second set of training images 304 may be a dataset of mountain landscapes where each scene shares no common structure with the other. The second set of training images 304 may be generated based on the height, latitude and longitude of, for example, the five hundred sixty three highest mountains in, for example, the Alps. Satellite images combined with topography data can be used to sample random views of each mountain at a fixed height for the second set of training images 304. A few samples from this dataset are shown in FIG. 3. This dataset may be extremely challenging for neural rendering, with varied and complex geometry and texture.

The second set of training images 304 in this example includes multiple training images 306, each including a particular view a training object 307. The training objects 307 depicted in training images 306 may be a different class of training objects (e.g., mountains) from training objects 303. Training data 210 may include several training images 304, from several views, of each of several mountains.

The third set of training images 308 may be a dataset of real images (e.g., images of physical objects such as succulents, from several views, such as several viewing angles, distances, and/or positions). The third set of training images 308 in this example consists of images of succulent plants observed from different views around a table (e.g., views varying the azimuth but keeping elevation constant). The lighting and background in images 310 of the third set of training images 308 is approximately constant for all the scenes in the images, and there is some noise in the azimuth and elevation measurements. The third set of training images 308 may include, for example, twenty distinct succulents, and, for example, sixteen views of each succulent. Some samples from the dataset are shown in FIG. 3.

The third set of training images 308 in this example includes multiple images 310, each including a particular view of a particular training object 311. The training objects 311 depicted in images 310 may be a different class of training objects (e.g., succulents) from training objects 303 and training objects 307. Training data 210 may include several training images 304, from several views, of each of several mountains.

The first set of training images 300, the second set of training image 304, and the third set of training images 308 provide three new challenging datasets that can be used to train ML model 220 and test representations and neural rendering for complex, natural scenes, and show compelling rendering results for each, highlighting the versatility of the disclosed system and methods.

Designing useful 3D scene representations for neural networks is a challenging task. While several works have used traditional 3D representations such as voxel grids, meshes, point clouds and signed distance functions, they each have limitations. For example, it is often difficult to scalably incorporate texture, non-rigid objects, and lighting into these representations. Recently, neural scene representations have been proposed to overcome these problems, usually by incorporating ideas from graphics rendering into the model architecture.

In the present disclosure, equivariance with respect to 3D transformations provides a strong inductive bias for neural rendering and scene representations. Indeed, for many tasks, scene representations need not be explicit (such as point clouds and meshes) as long as the scene representations transform like explicit representations.

However, building such models in practice is challenging. In the subject disclosure, a model is provided that includes an inverse renderer mapping an image to a neural scene representation and a forward neural renderer generating outputs such as images from representations. The scene representations themselves can be three-dimensional tensors which can undergo the same transformations as an explicit 3D scene. In the subject disclosure, specific examples focus on 3D rotations, although the model can be generalized to other symmetry transformations such as translation and scaling.

Figure 4:
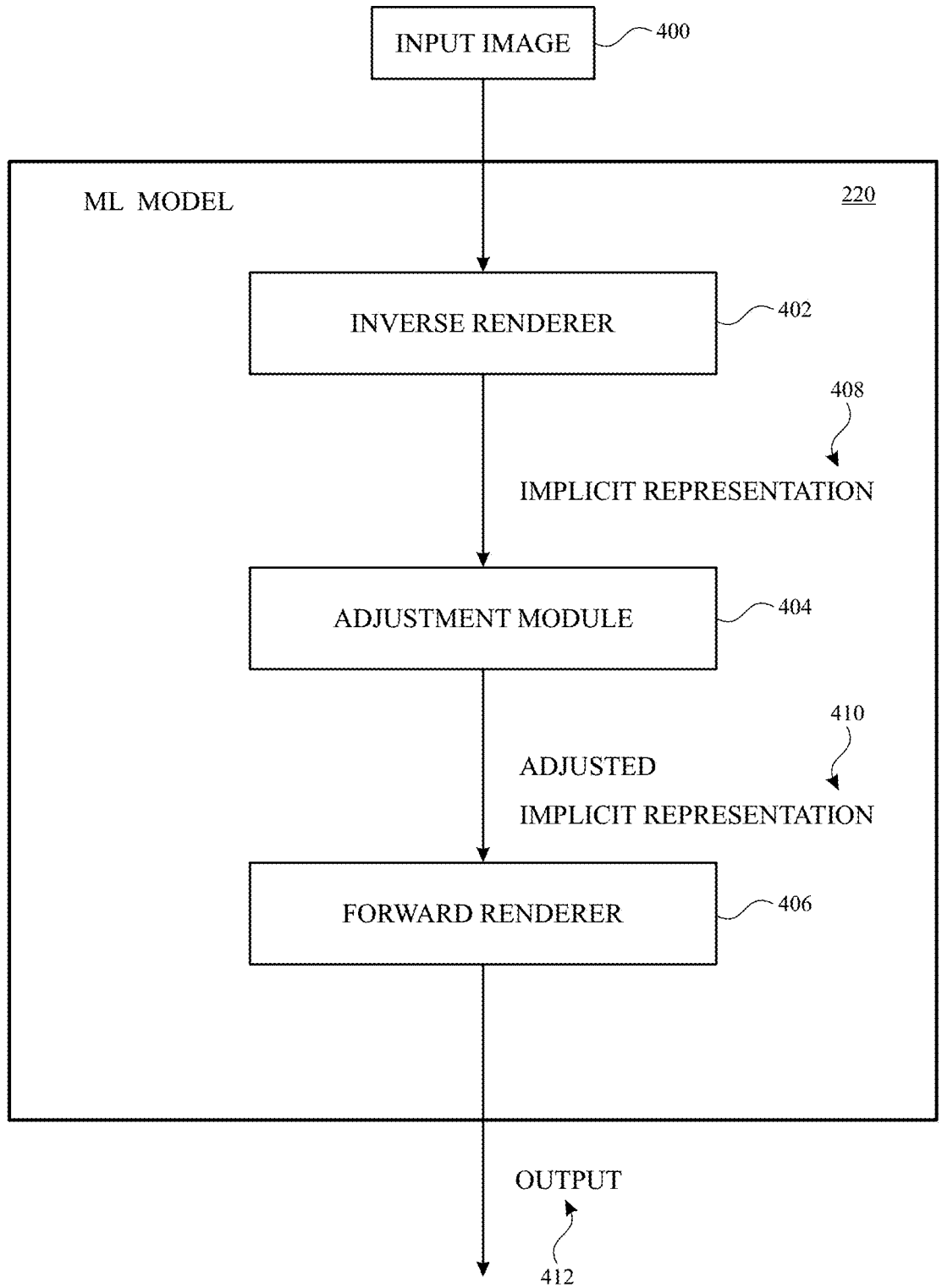
FIG. 4 illustrates a schematic diagram of a machine learning model in accordance with one or more implementations.

FIG. 4 schematically illustrates components that may be included in machine learning model 220. As shown the example of FIG. 4, machine learning model 220 may include an inverse renderer 402 and a forward renderer 406. An adjustment module 404 may be provided between the inverse renderer 402 and the forward renderer 406. Inverse renderer 402 is trained to generate an implicit representation 408 (also referred to as a scene representation) of an object from an input image 400 of the object (e.g., a two-dimensional input image) from a particular view. Forward renderer 406 generates an output 412 based on the implicit representation 408 from the inverse renderer 402.

Output 412 may be, for example, an output two-dimensional image of the object from a different view that is rotated, translated, and/or scaled relative to the particular view of the input image 400. The output may, as another example, include a three-dimensional representation of the object. The three-dimensional representation of the object may be a mesh, a point cloud, or a voxel grid that would be visually recognizable as the object to a human user (e.g., if the explicit representation were to be rendered on a computer display such as a display of electronic device 110). The ML model 220 may generate, based on the provided input image 400, at least one of an output image that depicts the object from a rotated view that is different from the view of the object in the input image 400, or a three-dimensional representation of the object.

As shown in FIG. 4, in some operational scenarios, the implicit representation 408 generated by inverse renderer 402 may be provided to adjustment module 404 before implicit representation 408 is provided to forward renderer 406. Adjustment module 404 may adjust implicit representation 408 by rotating, translating, and/or scaling implicit representation 408 to generate an adjusted implicit representation 410. For example, adjustment module 404 may be a rotation module that rotates implicit representation 408. Adjustment module 404 may, for example, be a shear rotation module. A shear rotation module can be particularly helpful for facilitating machine learning models based on rotational equivariance.

In accordance with aspects of the disclosure, a model is trained with no 3D supervision and using only images and their relative poses to learn equivariant scene representations. Unlike most other scene representation models, the disclosed model does not require any pose information at inference time. From a single image, the model can infer a scene representation, transform it and render it (see, e.g., FIGS. 7-9 discussed hereinafter). Further, the model can infer scene representations in a single forward pass, in contrast with conventional scene representation algorithms that may require a computationally and/or resource expensive optimization procedure to extract scene representations from an image or a set of images.

In accordance with various aspects, the subject technology introduces a framework for learning scene representations and novel view synthesis without explicit 3D supervision, by enforcing equivariance between the change in viewpoint and change in the latent representation of a scene.

Figure 5:
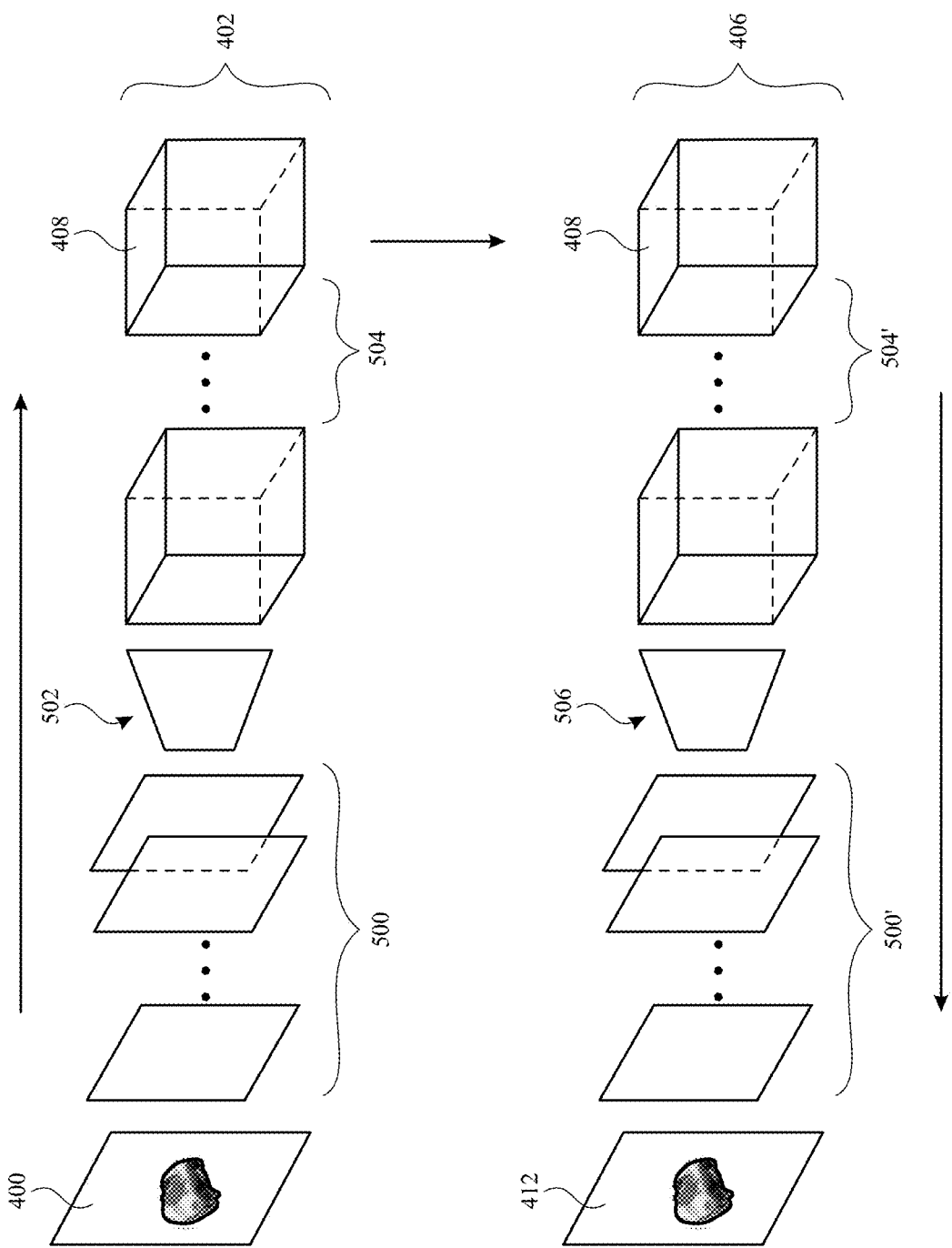
FIG. 5 illustrates features of a model architecture of a machine learning model in accordance with one or more implementations.

FIG. 5 illustrates additional details of a model architecture that can be used for ML model 220. In accordance with aspects of the disclosure, the model architecture may be fully differentiable, including the shear rotation operations discussed in further detail hereinafter. Providing a fully differentiable model architecture facilitates achieving a model that can be trained with back-propagation to update all learnable parameters in the neural network. As shown in the example of FIG. 5, an input image 400 (e.g., an image depicting a car) is mapped through one or more 2D convolutions 500, followed by an inverse projection 502 and a set of 3D convolutions 504 (e.g., by inverse renderer 402) to generate implicit representation 408. In the example of FIG. 5, the inferred scene (e.g., implicit representation 408) is then rendered (e.g., by forward renderer 406) through a transpose 504' of the 3D convolutions, a forward projection 506, and a transpose 500' of the one more 2D convolutions to render an output 412 (e.g., an output image), that, in this example, is a copy of the input image 400. In this example, the implicit representation 408 is provided to the forward renderer 406 without rotation, resulting in an output 412 (e.g., an output image), that, in this example, is a copy of the input image 400.

Figure 6:
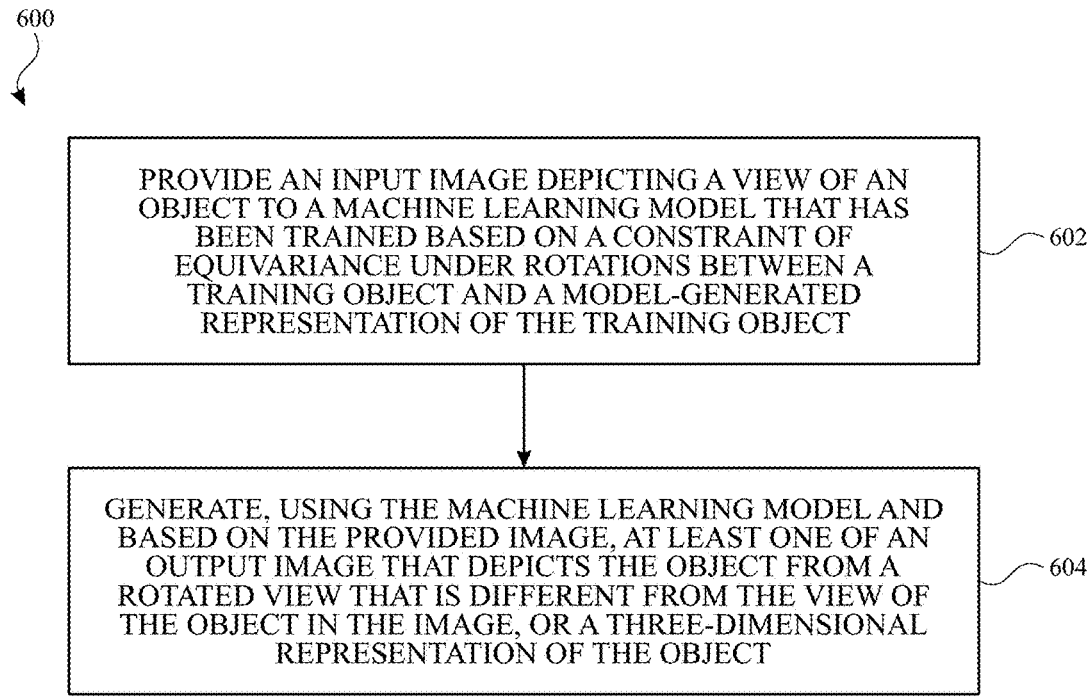
FIG. 6 illustrates a flow diagram of an example process for operating a trained machine learning model in accordance with one or more implementations.

FIG. 6 illustrates a flow diagram of an example process for generating an output using a machine learning model in accordance with one or more implementations. For explanatory purposes, the process 600 is primarily described herein with reference to the server 120 of FIG. 1. However, the process 600 is not limited to the server 120 of FIG. 1, and one or more blocks (or operations) of the process 600 may be performed by one or more other components of the server 120 and/or by other suitable devices such as electronic device 110. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, server 120 provides an input image, such as input image 400 of FIG. 4, depicting a view of an object to a machine learning model such as ML model 220 that has been trained based on a constraint of equivariance under rotations between a training object (e.g., one or more of the training objects 303, 307, and 311 of FIG. 3) and a model-generated representation (e.g., an implicit representation) of the training object.

The machine learning model may include an inverse renderer such as inverse renderer 402 and a forward renderer such as forward renderer 406.

At block 604, server 120 generates, using the machine learning model and based on the provided image, at least one of an output image that depicts the object from a rotated view that is different from the view of the object in the image, or a three-dimensional representation of the object. The three-dimensional representation may include an explicit three-dimensional representation including at least one of a voxel grid, a mesh or a point cloud.

Generating, at block 604, the at least one of the output image that depicts the object from the rotated view that is different from the view of the object in the image or the three-dimensional representation of the object may include generating the at least one of the output image that depicts the object from the rotated view that is different from the view of the object in the image or the three-dimensional representation of the object with the forward renderer. The generating operations of block 604 may also include generating an implicit representation, such as implicit representation 408, of the object with the inverse renderer based on the input image.

The forward renderer may generate the at least one of the output image that depicts the object from the rotated view that is different from the view of the object in the image or the three-dimensional representation of the object based on the implicit representation generated by the inverse renderer. Generating, at block 604, the at least one of the output image that depicts the object from the rotated view that is different from the view of the object in the image or the three-dimensional representation of the object based on the implicit representation may include rotating the implicit representation of the object.

The machine learning module may include an adjustment module such as adjustment module 404 for performing the rotation of the implicit representation. Rotating the implicit representation of the object may include performing a shear rotation of the implicit representation of the object. The implicit representation of the object may be, for example, a tensor or a latent space of an autoencoder.

Defining tensor rotations in 3D is not straightforward and it has been discovered that naive tensor rotations may not be used to learn equivariant representations. Adjustment module 404 may provide a new differentiable layer, for performing invertible shear rotations, which allows for the neural network to learn equivariant representations. In accordance with various aspects, the subject technology shows that naive tensor rotations are not able to achieve equivariance, and introduces an invertible shearing operation that addresses this limitation within a differentiable neural architecture.

Figure 7:
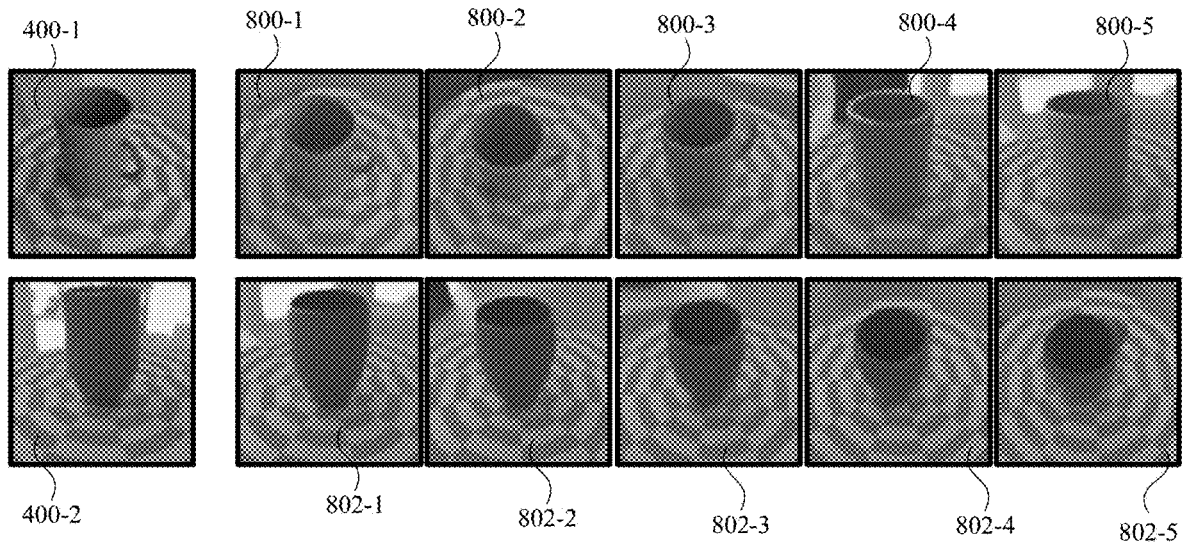
FIG. 7 illustrates output images that may be generated by a trained machine learning model based on various input images in accordance with one or more implementations.
Figure 8:
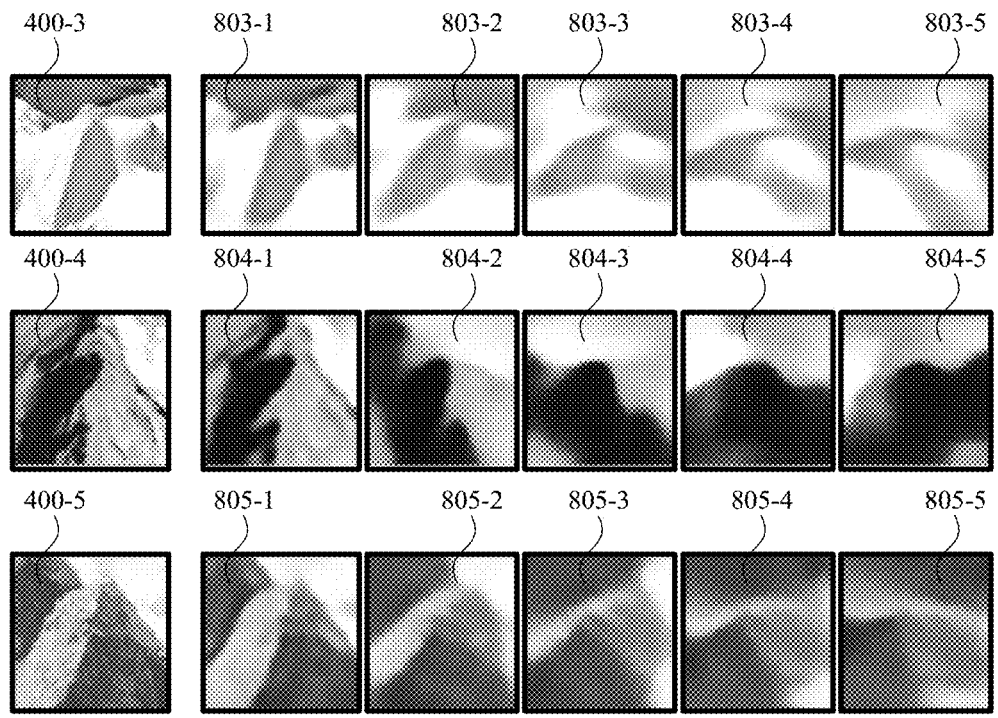
FIG. 8 illustrates additional output images that may be generated by a trained machine learning model based on various additional input images in accordance with one or more implementations.
Figure 9:
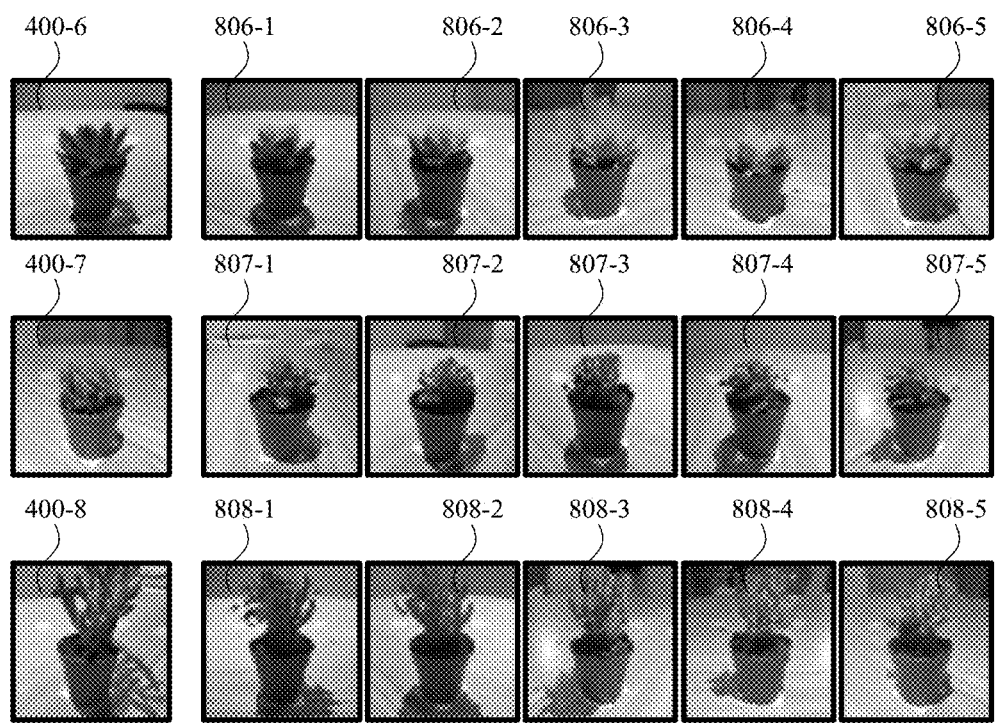
FIG. 9 illustrates further output images that may be generated by a trained machine learning model based on various further input images in accordance with one or more implementations.

FIGS. 7, 8, and 9 illustrate various example outputs of a ML model such as ML model 220 trained based on a constraint of equivariance under rotations between a training object and a model-generated representation of the training object. In the examples of FIGS. 7, 8, and 9, the outputs are output images that each depicts the object shown in an input image from a rotated view that is different from the view of the object in the image.

FIG. 7 illustrates two input images 400-1 and 400-2 respectively depicting two different views of two different mugs. FIG. 7 also shows five output images generated by ML model 220 based on each of the two input images 400-1 and 400-2. For input image 400-1, five output images 800-1, 800-2, 800-3, 800-4, and 800-5 are shown, each depicting the mug in input image 400-1, but from a different view than the view depicted in input image 400-1. For input image 400-2, five output images 802-1, 802-2, 802-3, 802-4, and 802-5 are shown, each depicting the mug in input image 400-2, but from a different view than the view depicted in input image 400-2.

The results shown in FIG. 7 for single shot novel view synthesis on previously unseen mugs shows that ML model 220 successfully infers the shape of previously unseen mugs from a single image and is able to perform large viewpoint transformations around the scene. Even from difficult viewpoints, the model is able to produce consistent and realistic views of the scenes, even generating reflections on the mug edges and hallucinating mug handles when they are not visible, showing that model has learned a good prior over the object shapes.

FIG. 8 illustrates three input images 400-3, 400-4, and 400-5 respectively depicting three different views of three different mountains. FIG. 8 also shows five output images generated by ML model 220 based on each of the three input images 400-3, 400-4, and 400-5. For input image 400-3, five output images 803-1, 803-2, 803-3, 803-4, and 803-5 are shown, each depicting the mountain in input image 400-3, but from a different view than the view depicted in input image 400-3. For input image 400-4, five output images 804-1, 804-2, 804-3, 804-4, and 804-5 are shown, each depicting the mountain in input image 400-4, but from a different view than the view depicted in input image 400-4. For input image 400-5, five output images 805-1, 805-2, 805-3, 805-4, and 805-5 are shown, each depicting the mountain in input image 400-5, but from a different view than the view depicted in input image 400-5.

The results shown in FIG. 8 for single shot novel view synthesis shows that, even for input images depicting complex objects and backgrounds such as a mountain scene, while the model may struggle to capture high frequency detail, it faithfully reproduces the 3D structure and texture of the mountain as the camera rotates around the inferred scene representation. For a wide variety of mountain landscapes (e.g., snowy, rocky, etc.), ML model 220 is able to generate plausible other views of the landscape.

FIG. 9 illustrates three input images 400-6, 400-7, and 400-8 respectively depicting three different views of three different plants (e.g., succulent plants). FIG. 9 also shows five output images generated by ML model 220 based on each of the three input images 400-6, 400-7, and 400-8. For input image 400-6, five output images 806-1, 806-2, 806-3, 806-4, and 806-5 are shown, each depicting the succulent in input image 400-6, but from a different view than the view depicted in input image 400-6. For input image 400-7, five output images 807-1, 807-2, 807-3, 807-4, and 807-5 are shown, each depicting the succulent in input image 400-7, but from a different view than the view depicted in input image 400-7. For input image 400-8, five output images 808-1, 808-2, 808-3, 808-4, and 808-5 are shown, each depicting the succulent in input image 400-8, but from a different view than the view depicted in input image 400-8.

The results shown in FIG. 9 for novel view synthesis results show that ML model 220 is able to generate plausible other views of plants depicted in an input image, and in particular creates remarkably consistent shadows. Additional plant input training images can be used to further train ML model to learn a strong prior over the shapes of plants to reduce or avoid the network overfitting the input data at runtime.

In various implementations, different ML models can be trained using training images of different categories of training objects (e.g., mugs, mountains, plants, etc.) to perform neural rendering for input images of objects in that category, or a single ML model can be trained using training images of various categories of objects to train the single ML model to perform neural rendering for input images of substantially any object or scene.

As described above, two-dimensional output images such as the output images shown in FIGS. 7, 8, and 9, are only one example of the output of trained ML model 220. In other implementations, ML model 220 may output three-dimensional information about an object depicted in a two dimensional image, such as a three-dimensional representation of the object.

Figure 10:
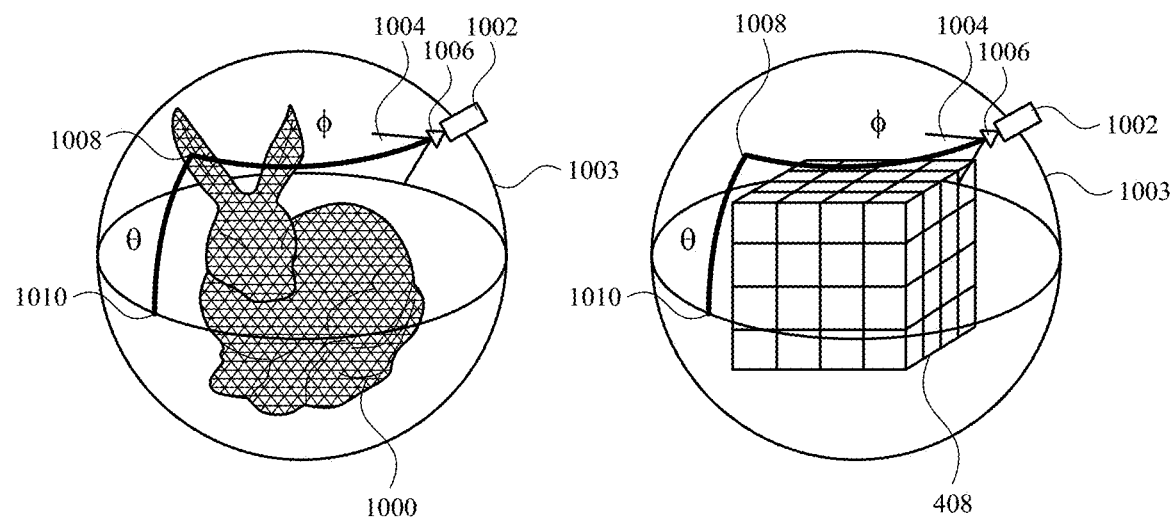
FIG. 10 illustrates various aspects of explicit three-dimensional representations and implicit three-dimensional representations of an object in accordance with one or more implementations.

FIG. 10 illustrates a three-dimensional representation 1000 of an object (e.g., a rabbit) that may be generated by the trained ML model 220 based on a depiction of the object in a two-dimensional input image. In FIG. 10, three-dimensional representation 1000 is an explicit three-dimensional representation (e.g., a mesh) that is recognizable to a human viewer as a rabbit and/or that can be rendered into a form that is recognizable to a human viewer as a rabbit. The three-dimensional representation generated by ML model 220 can be rendered as a point cloud, a voxel grid, or any other three-dimensional representation.

FIG. 10 also illustrates an implicit representation 408 of the same object (e.g., the rabbit) that is not recognizable to a human viewer, but that is rotationally equivariant with the explicit three-dimensional representation 1000. As indicated by the camera 1002 in FIG. 10, explicit three-dimensional representation 1000 can be viewed from a view 1004 from a location 1006 on a sphere (e.g., for rendering an output image such as the output images shown in FIGS. 7, 8, and 9), or from views associated with other location such as locations 1008 and 1010 on sphere 1003. Implicit representation 408 can also be viewed from any of the locations 1006, 1008, 1010 on the sphere 1003 (or any other suitable location). In order to train ML model 220 to be able to generate explicit three-dimensional representation 1000 and/or the output images of FIGS. 7, 8, and 9, the model can be trained based on an equivariance constraint the enforces (e.g., rotational) equivariance of the implicit representation 408 of an object with the object itself (e.g., under the same rotations).

Figure 11:
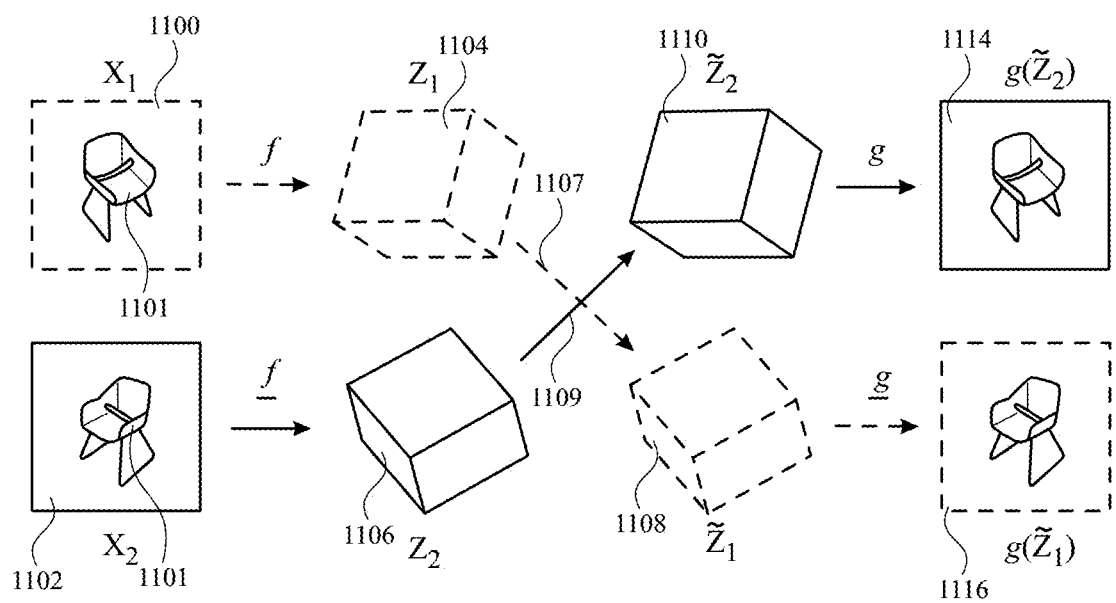
FIG. 11 illustrates a process for training a machine learning model in accordance with one or more implementations.

FIG. 11 illustrates a training operation for ML model 220 using an equivariance constraint. As shown in FIG. 11, training a ML model using an equivariance constraint can be performed using two input training images 1100 and 1102 depicting the same input training object 1101 from two different views (e.g., rotated views).

As illustrated in FIG. 11, training ML model 220 based on a constraint of equivariance under rotations between the training object 1101 and a model-generated representation of the training object may include providing a first input training image 1100 (also referred to as $x_1$) depicting a first view of the training object 1101 to the machine learning model, and providing a second input training image 1102 (also referred to as $x_2$) depicting a second view of the training object 1101 to the machine learning model.

The training may also include generating a first implicit representation 1104 (also referred to as $z_1$) of the training object 1101 based on the first input training image 1100 (e.g., in an operation $f(x_1)$) and generating a second implicit representation 1106 (also referred to as $z_2$) of the training object 1101 based on the second input training image 1102 (e.g., in an operation $f(x_2)$). The training may also include rotating the first implicit representation 1104 of the training object 1101 as indicated by arrow 1107 (e.g., to form a rotated implicit representation 1108, also referred to as $\tilde{z}_1$) and rotating the second implicit representation 1106 of the training object 1101 as indicated by arrow 1109 (e.g., to form a rotated implicit representation 1108, also referred to as $\tilde{z}_2$).

The training may also include generating a first output training image 1116 (also referred to as $g(\tilde{z}_1)$) based on the rotated first implicit representation 1108 of the training object 1101 and generating a second output training image 1114 (also referred to as $g(\tilde{z}_2)$) based on the rotated second implicit representation 1110 of the training object 1101. The training may also include comparing the first input training image 1100 to the second output training image 1114 and comparing the second input training image 1102 to the first output training image 1116.

Figure 12:
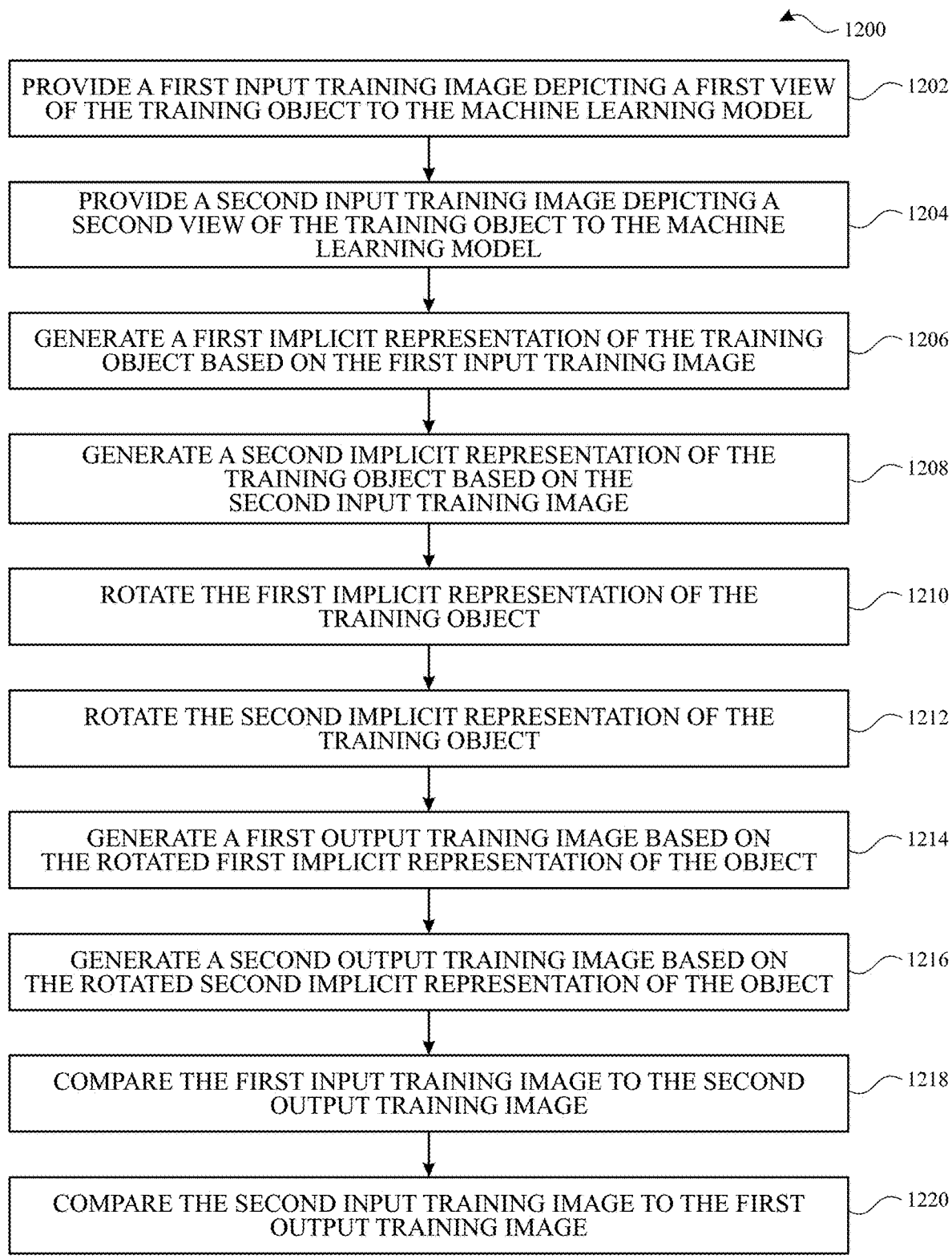
FIG. 12 illustrates a flow diagram of an example process for training a machine learning model in accordance with one or more implementations.

FIG. 12 illustrates a flow diagram of an example process for training a model such as ML model 220 based on the constraint of equivariance under rotations between the training object and the model-generated representation in accordance with one or more implementations. For explanatory purposes, the process 1200 is primarily described herein with reference to the server 120 of FIG. 1. However, the process 1200 is not limited to the server 120 of FIG. 1, and one or more blocks (or operations) of the process 1200 may be performed by one or more other components of the server 120 and/or by other suitable devices such as electronic device 110. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

At block 1202, server 120 may provide a first input training image such as input training image 1100 of FIG. 11, depicting a first view of a training object such as training object 1101 to the machine learning model.

At block 1204, server 120 may provide a second input training image such as input training image 1102 of FIG. 11, depicting a second view of a training object such as training object 1101 to the machine learning model.

At block 1206, server 120 may generate a first implicit representation, such as implicit representation 1104, of the training object based on the first input training image.

At block 1208, server 120 may generate a second implicit representation, such as implicit representation 1106, of the training object based on the second input training image.

At block 1210, server 120 may rotate the first implicit representation of the training object (e.g., to form a rotated first implicit representation 1108).

At block 1212, server 120 may rotate the second implicit representation of the training object (e.g., to form a rotated second implicit representation 1110).

At block 1214, server 120 may generate a first output training image, such as output training image 1116 based on the rotated first implicit representation 1108 of the training object.

At block 1216, server 120 may generate a second output training image, such as output training image 1114 based on the rotated second implicit representation 1110 of the training object.

At block 1218, server 120 may compare the first input training image to the second output training image.

At block 1220, server 120 may compare the second input training image to the first output training image. The training (e.g., the comparing of the first input training image to the second output training image and the second input training image to the first output training image) may include minimizing a loss function based on the comparison of the first input training image to the second output training image and the comparison of the second input training image to the first output training image.

As discussed herein, in one or more embodiments the framework for ML model 220 may be composed of two models: an inverse renderer $f: X \rightarrow Z$ (see also, inverse renderer 402 of FIG. 4) that maps an image $x \in X$ into a scene representation $z \in Z$ and a forward renderer $g: Z \rightarrow X$ (see also, forward renderer 406 of FIG. 4) that maps scene representations to images. Assume $X = \mathbb{R}^{c \times h \times w}$, where c, h, w are the channels, height, and width of the images and similarly that $Z = \mathbb{R}^{c_s \times d_s \times h_s \times w_s}$, where $c_s$, $d_s$, $h_s$, $w_s$, are the channels, depth, height and, width of the scene representation.

As, in general, access to ground truth geometry for the 3D scenes is not available, structure is imposed on the scene representations z by ensuring that they transform like a 3D scene. Specifically, the training operations ensure that the inverse renderer f and the forward renderer g are equivariant with respect to rotations of the scene. The rotation operation is denoted in scene space by $R^Z$ and the equivalent rotation operation acting on rendered images x by $R^X$. Equivariance of the inverse renderer (or encoder) f and forward renderer (or decoder) g is then given by:

$$R^Z f(x) = f(R^X x)$$
$$R^X g(z) = g(R^Z z). \quad (1)$$

The top equation in Equation (1) implies that if a camera viewpoint change is performed in image space, the scene representation encoded by f should undergo an equivalent rotation. The second equation implies that if the scene representation is rotated, the images rendered by g should undergo an equivalent rotation.

To design a loss function that enforces equivariance with respect to the rotation transformation, consider two images of the same scene and their relative transformation, $(x_1, x_2, \Delta\phi, \Delta\theta)$ as described above in connection with FIG. 11. The server 120 first maps the images through the inverse renderer to obtain their scene representations $z_1 = f(x_1)$ and $z_2 = f(x_2)$. The server 120 (e.g., adjustment module 404) then rotates each encoded representation (e.g., first and second implicit representations 1104 and 1106) by its relative transformation $R_\Delta^Z$, such that $\tilde{z}_1 R_\Delta^Z z_1$ and $\tilde{z}_2 = (R_\Delta^Z)^{-1} z_2$. As $z_1$ and $z_2$ represent the same scene in different poses, the rotated $\tilde{z}_1$ can be expected to be rendered as the image $x_2$ and the rotated $\tilde{z}_2$ as $x_1$, as is illustrated in FIG. 11. The training can then ensure that the model obeys these transformations by minimizing a loss function $\mathcal{L}_{render}$, where:

$$\mathcal{L}_{render} = \|x_2 - g(\tilde{z}_1)\|_1 + \|x_1 - g(\tilde{z}_2)\|_1. \quad (2)$$

As $x_2 = R_\Delta^X x_1$, minimizing this loss then corresponds to satisfying the equivariance property for the forward renderer g. While this loss enforces equivariance of g, in practice it has been discovered that this does not in general enforce equivariance of the inverse renderer f. Therefore, training the machine learning model can also include comparing the first implicit representation 1104 to the rotated second implicit representation 1110, and comparing the second implicit representation 1106 to the rotated first implicit representation 1108. For example, the loss function can be further based on the comparison of the first implicit representation to the rotated second implicit representation and the comparison of the second implicit representation to the rotated first implicit representation. For example, a loss function that enforces equivariance of the inverse renderer with respect to rotations can be defined as $\mathcal{L}_{scene}$:

$$\mathcal{L}_{scene} = \|f(x_2) - \tilde{z}_1\|_2 + \|f(x_1) - \tilde{z}_2\|_2. \quad (3)$$

The total loss function can be a weighted sum of $\mathcal{L}_{render}$ and $\mathcal{L}_{scene}$, ensuring that both the inverse and forward renderer in the trained machine learning model 220 are equivariant with respect to rotations of the viewpoint or camera.

Any or all of the operations described above in connection with blocks 1202-1220 for training the model may be performed based on at least two images without three-dimensional supervision of the training. The trained machine learning model may be tested without providing pose information to the trained machine learning model.

It has been discovered that defining the rotation operation in scene space $R^Z$ is particularly helpful. Indeed, naive tensor rotations are ill suited for this task due to spatial aliasing, that is rotating points on a discrete grid generally result in the rotated points not aligning with the grid, requiring some form of sampling to reconstruct their values.

To illustrate this point, the following describes rotations of 2D images (since the effects for 3D rotations of tensors are the same). To demonstrate the aliasing effects that arises from rotating on a grid, an image can be rotated by an angle $\theta$ and then the resulting image can be rotated by an angle $-\theta$ (sampling with bilinear interpolation to obtain the values at the grid points). If rotations on the grid were invertible, the final image should then be exactly the same as the original image. To test whether this holds in practice, one thousand images were sampled from the CIFAR10 dataset, each were rotated back and forth by every angle in [0, 360] and the error was recorded. In this exemplary scenario, the mean pixel value error is on the order of 3%, which is significant.

These results imply that tensor rotations may not be used to learn scene representations that are equivariant with respect to camera rotations. Indeed, for tensor rotations, the rotation operation $R^Z$ is not invertible, that is $R^Z \cdot (R^Z)^{-1} \neq I$. Consider, for example, a camera rotation $\overline{R}^X$ in image space, followed by its inverse:

$$R^X \cdot (R^X)^{-1} x = x. \quad (4)$$

Applying f to both sides of this equation (4) and using the equivariance property twice then yields:

$$R^Z \cdot (R^Z)^{-1} f(x) = f(x). \quad (5)$$

Since $R^Z \cdot (R^Z)^{-1} \neq I$ in general for tensor rotations, the equivariance equations may not be satisfied with this operator. To overcome this problem, adjustment module 404 (see FIG. 4) can be implemented to perform rotations by performing shear rotations.

In the discussion below, it is shown that shear rotations can be used to define invertible tensor rotations that can be used in neural networks. Rotating an image corresponds to rotating pixel values at given (x, y) coordinates in the image by applying a rotation matrix to the coordinate vector. Shear rotations instead rotate images by performing a sequence of shearing operations. In accordance with aspects of the disclosure, the rotation matrix can be factorized as:

$$\begin{pmatrix} \cos\theta & \sin\theta \\ -\sin\theta & \cos\theta \end{pmatrix} = \begin{pmatrix} 1 & -\tan\frac{\theta}{2} \\ 0 & 1 \end{pmatrix} \begin{pmatrix} 1 & 0 \\ \sin\theta & 1 \end{pmatrix} \begin{pmatrix} 1 & -\tan\frac{\theta}{2} \\ 0 & 1 \end{pmatrix}, \quad (5)$$

so the rotation is performed with three shearing operations as opposed to a single matrix multiplication.

Figure 13:
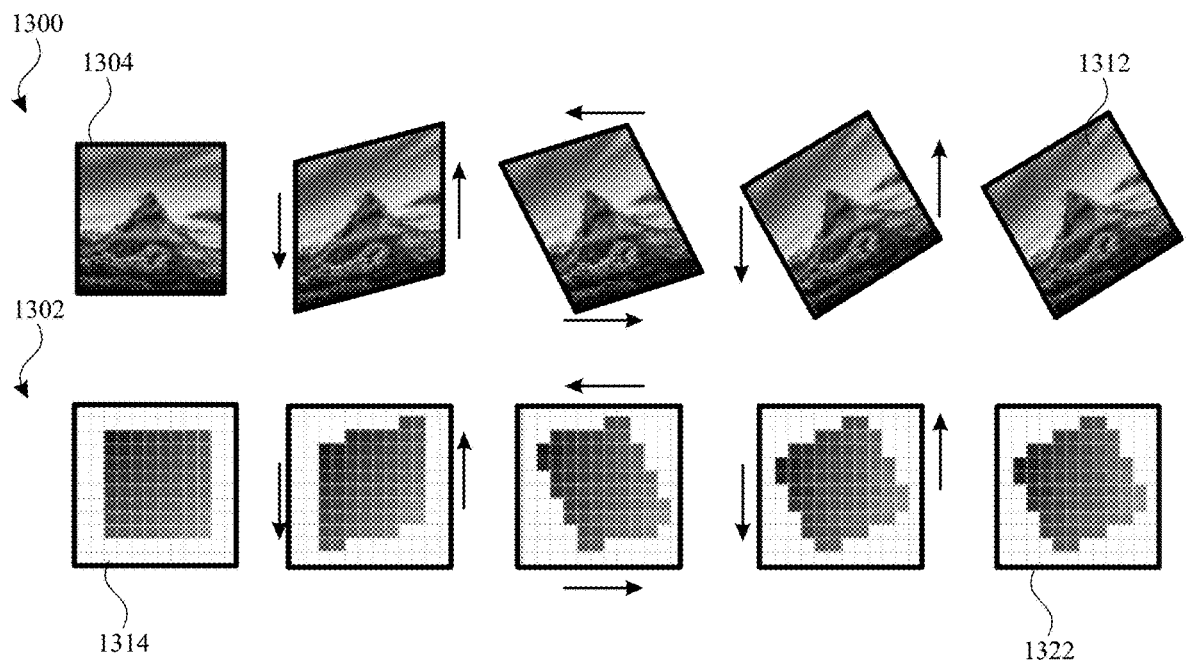
FIG. 13 illustrates an examples of shear rotation operations in accordance with one or more implementations.

For example, as shown in FIG. 13, in a shear rotation operation 1300, an input image 1304 can be sheared three times to obtain a rotated image 1312. FIG. 13 also illustrates how a nearest neighbor shear rotation operation 1302 to rotate an input image 1314 to a rotated output image 1322 with three nearest neighbor shear operation can allow adjustment module 404 to perform invertible rotations on a grid.

While the shear operations themselves will not align with the grid coordinates and so also require a form of interpolation, the following shows how these operations can be made invertible by using a nearest neighbor approach (e.g., with adjustment module 404).

Applying a shear transformation involves shifting either columns or rows of the image but not both. Therefore, for each shifted point there is unique nearest neighbor on the grid. In contrast, for regular rotations, two shifted points may get mapped to the same grid point by a nearest neighbor operation.

Figure 14:
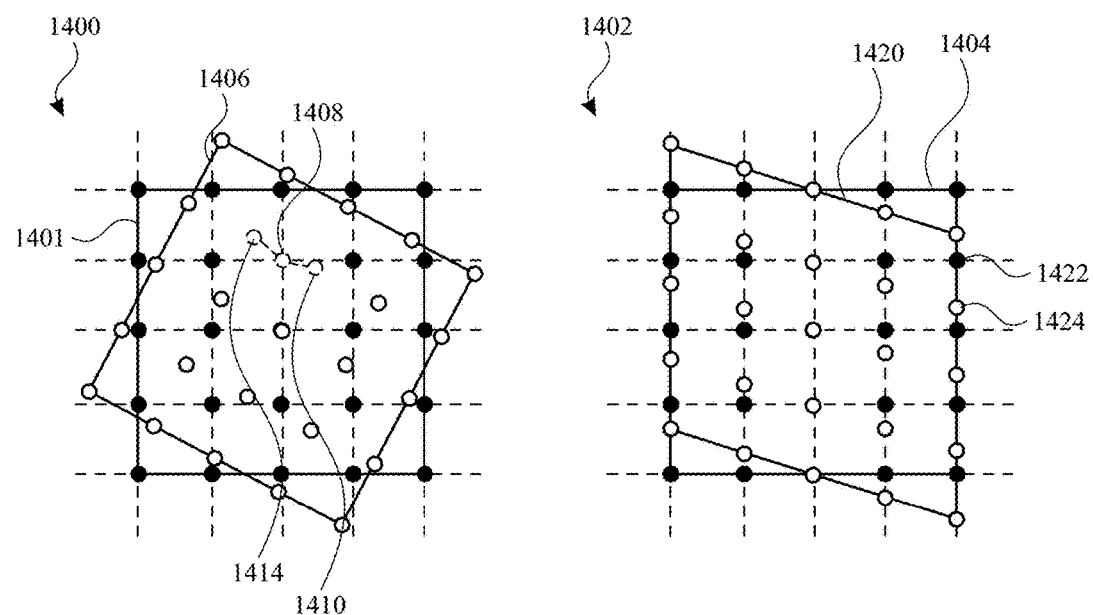
FIG. 14 illustrates additional details of an example shear rotation operation in accordance with one or more implementations.

FIG. 14 illustrates a regular rotation 1400 of an image 1401 to a rotated image 1406 in which two shifted points 1410 and 1414 can get mapped to the same grid point 1408 by a nearest neighbor operation. In contrast, FIG. 14 also illustrates a shear rotation operation 1402 of an image 1404 to a rotated image 1420 in which, for each shifted point 1424 there is unique nearest neighbor 1422 on the grid.

Since server 120 can find a unique nearest neighbor for each grid point, shearing with nearest neighbors is therefore an invertible operation. As each shearing operation is invertible, the composition of three shearing operations is also invertible, implying that an invertible rotation on the grid can be defined and performed by adjustment module 404 in some implementations.

While defining tensor rotations with shearing allows for invertibility, there can be a trade-off in angle resolution. Indeed, the smallest rotation that can be represented with invertible shear rotations depends on the grid size n as:

$$\theta = \sin^{-1}\left(\frac{1}{n-1}\right). \tag{6}$$

This implies that the model may not be equivariant with respect to continuous rotation, but only equivariant up to a finite angle resolution. However, for the grid sizes used in practice, the angle resolution is sharp enough to model most rotations. For example, for a 32×32 grid, the angle resolution is less than 2 degrees. A few examples of the numerical value of the angle resolution are given in Table 1 below.

TABLE 1

| Angle resolution (in degrees) for various grid sizes | | | | |
| --- | --- | --- | --- | --- |
| GRID SIZE | 8 | 16 | 32 | 64 |
| ANGLE RESOLUTION | 8.21° | 3.82° | 1.85° | 0.91° |

The shear rotation matrix factorization involves a $\tan(\theta/2)$ term. For rotations of the "camera" or view on the full sphere around the scene representation, adjustment module 404 may perform rotations for $\theta \in [0, 360)$. To avoid infinities with the tan function, angles can be decomposed as $\theta = \theta_{90n} + \theta_{small}$ where $\theta_{90n} \in \{0, 90, 180, 270\}$ and $\theta_{small} \in [-45, 45]$. As image rotations on the grid are invertible for multiples of 90, 90, 180 and 270 degree rotations can first be performed by flipping and transposing the image, followed by a shear rotation for the small angle small. This results in only performing shear rotations for angles in [−45, 45], avoiding any numerical problems.

While the shear rotation operation has been defined above for 2D grids, the discussion above extend this to 3D grids by performing two 2D rotations. The full invertible shear rotation operation $R^z$ can be defined as performing an elevation rotation by angle around the width axis, followed by an azimuth rotation around the height axis of the scene representation.

The shear rotation operation is discontinuous in the angles. However, this does not matter in practice as it is not necessary to calculate gradients with respect to the angles. Indeed, the shear rotation layer of machine learning model 220 can correspond to shuffling the positions of voxels in the scene representation tensor, allowing back propagation through the operation.

As described above, one aspect of the present technology is the use of images from specific and legitimate sources for neural rendering. The present disclosure contemplates that in some instances, the images may include personal information data that uniquely identifies or can be used to identify a specific person. Such personal information data can include images of a user's face or portions of the user's body, video data, demographic data, location-based data, online identifiers, printed information such as telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for neural rendering of images of people.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of neural rendering, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 15:
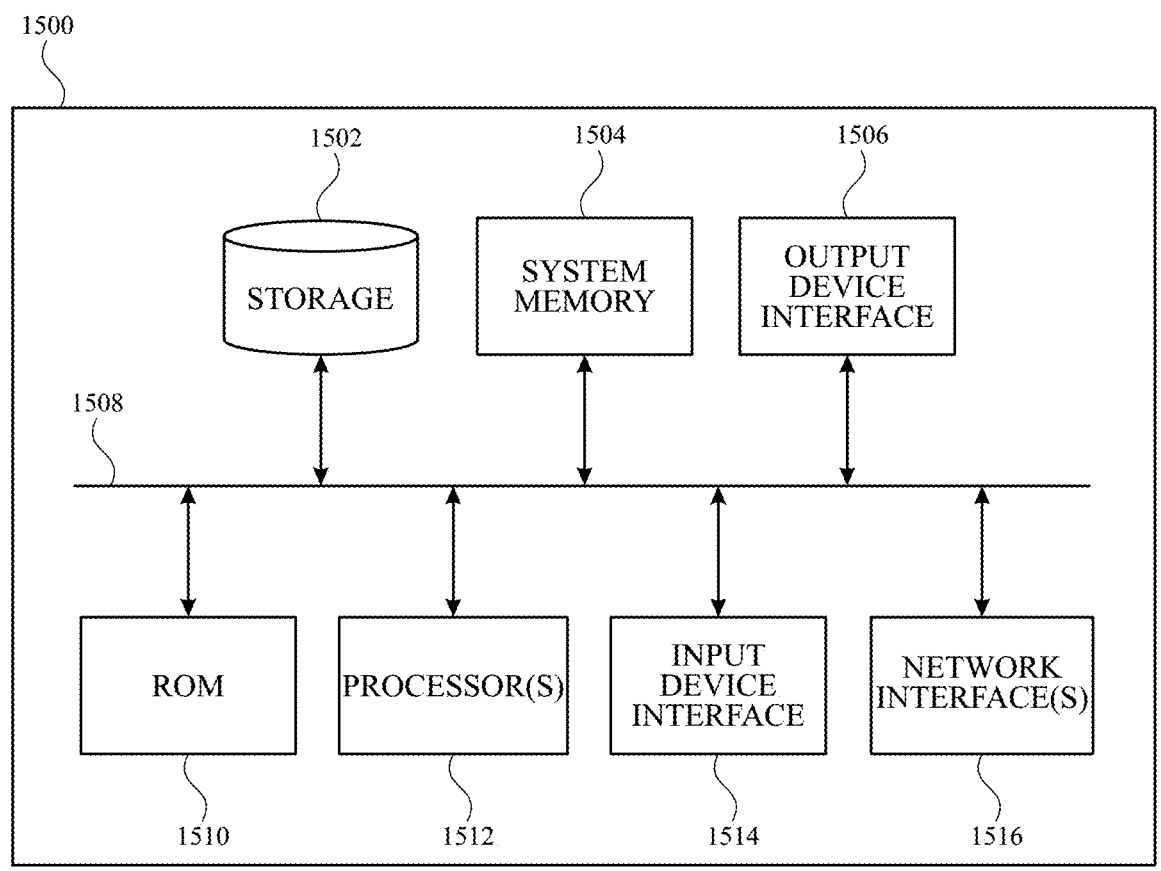
FIG. 15 illustrates an electronic system with which one or more implementations of the subject technology may be implemented.

FIG. 15 illustrates an electronic system 1500 with which one or more implementations of the subject technology may be implemented. The electronic system 1500 can be, and/or can be a part of, the electronic device 110, and/or the server 120 shown in FIG. 1. The electronic system 1500 may include various types of computer readable media and interfaces for various other types of computer readable media. The electronic system 1500 includes a bus 1508, one or more processing unit(s) 1512, a system memory 1504 (and/or buffer), a ROM 1510, a permanent storage device 1502, an input device interface 1514, an output device interface 1506, and one or more network interfaces 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processing unit(s) 1512 with the ROM 1510, the system memory 1504, and the permanent storage device 1502. From these various memory units, the one or more processing unit(s) 1512 retrieves instructions to execute and data to process in order to execute the processes of the subject disclosure. The one or more processing unit(s) 1512 can be a single processor or a multi-core processor in different implementations.

The ROM 1510 stores static data and instructions that are needed by the one or more processing unit(s) 1512 and other modules of the electronic system 1500. The permanent storage device 1502, on the other hand, may be a read-and-write memory device. The permanent storage device 1502 may be a non-volatile memory unit that stores instructions and data even when the electronic system 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as random access memory. The system memory 1504 may store any of the instructions and data that one or more processing unit(s) 1512 may need at runtime. In one or more implementations, the processes of the subject disclosure are stored in the system memory 1504, the permanent storage device 1502, and/or the ROM 1510. From these various memory units, the one or more processing unit(s) 1512 retrieves instructions to execute and data to process in order to execute the processes of one or more implementations.

The bus 1508 also connects to the input and output device interfaces 1514 and 1506. The input device interface 1514 enables a user to communicate information and select commands to the electronic system 1500. Input devices that may be used with the input device interface 1514 may include, for example, alphanumeric keyboards and pointing devices (also called "cursor control devices"). The output device interface 1506 may enable, for example, the display of images generated by electronic system 1500. Output devices that may be used with the output device interface 1506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1508 also couples the electronic system 1500 to one or more networks and/or to one or more network nodes, such as the electronic device 110 shown in FIG. 1, through the one or more network interface(s) 1516. In this manner, the electronic system 1500 can be a part of a network of computers (such as a LAN, a wide area network ("WAN"), or an Intranet, or a network of networks, such as the Internet. Any or all components of the electronic system 1500 can be used in conjunction with the subject disclosure.

The disclosed systems and methods provide advantages for neural rendering, including providing a machine learning model that makes very few assumptions about the scene representation and rendering process. Indeed, the disclosed machine learning model learns representations simply by enforcing equivariance with respect to 3D rotations. As such, material, texture and lighting in a scene can be encoded into the model. The simplicity of the disclosed model also means that it can be trained purely from posed 2D images with no 3D supervision.

As described herein, these advantages facilitate other advantages including allowing the model to be applied to interesting data where obtaining 3D geometry is difficult. In contrast with other methods, the disclosed machine learning model does not require pose information at test time. Further, operating the disclosed machine learning model is fast: inferring a scene representation simply corresponds to performing a forward pass of a neural network. This is in contrast to other methods that require solving an expensive optimization problem at inference time for every new observed image.

In the disclosed systems and methods, rendering is also performed in a single forward pass, making it faster than other methods that often require recurrence to produce an image.

In operational scenarios in which training data is sparse (e.g., the number of views per scene is small), novel view synthesis models can exhibit tendency to "snap" to fixed views instead of smoothly rotating around the scene. The disclosed systems and methods contemplate additional training data and/or training operations to reduce this type of undesirable snapping.

In the disclosed systems and methods, equivariance is described in various examples as being enforced during training with respect to 3D rotations. However, real scenes have other symmetries like translation and scale. It should be appreciated that translation equivariance and scale equivariance can also be applied as constraints for model training.

Further, while the scene representations are sometimes described as being used to render images, additional structure can be enforced on the latent space to make the representations more interpretable or even editable. Additionally, it should be appreciated that adding inductive biases from the rendering process, such as explicitly handling occlusion, has been shown to improve performance of other models and could also be applied to the disclosed model. It should also be appreciated that the learned scene representation can be used to generate a 3D reconstruction. Indeed, most existing 3D reconstruction methods are object-centric (i.e. every object is reconstructed in the same orientation). This has been shown to cause models to effectively perform shape classification instead of reconstruction. As the disclosed scene representations are view-centric, the disclosed scene representations can be used to generate a 3D reconstruction in a view-centric case.

In the disclosed systems and methods, a machine learning model is provided that learns scene representations by ensuring that the representations transform like real 3D scenes.

It should also be appreciated that various examples are discussed herein in which the machine learning model is deterministic, while inferring a scene from an image is an inherently uncertain process. Indeed, for a given image, there are several plausible scenes that could have generated it and, similarly, several different scenes could be rendered as the same image. In some implementations, the disclosed systems and methods can be used to train a model to learn a distribution over scenes p(scene|image).

Further, in some of the examples described herein, during training each view pair in the training images is treated the same. However, views that are close to each other should be easier to reconstruct, while views that are far from each other may not be reconstructed exactly due to the inherent uncertainty caused by occlusion. The training operations described herein can be modified reflect this, for example, by weighting the reconstruction loss by how far scenes are from each other. It should also be appreciated that, in some examples described herein, pairs of views of a training object are provided to train the machine learning model. However, in some implementations, larger number of views of a training object can be provided to the machine-learning model, which would also reduce the entropy of the p(scene|image) distribution and enhance the training process.

In accordance with aspects of the disclosure, systems and methods are provided to learn scene representations by ensuring that the scene representations transform like real 3D scenes. To facilitate this learning, the model may include invertible shear rotations which allow the model to learn equivariant scene representations by gradient descent. The disclosed machine learning models can be trained without 3D supervision and can be trained using only posed 2D images. In accordance with aspects of the disclosure, systems and methods are provided to infer a scene representation directly from an image using a single forward pass of an inverse renderer. With the disclosed technology, the learned scene representation can easily be manipulated and rendered to produce new viewpoints of the scene.

Three challenging new datasets for neural rendering and scene representations are also provided. It has been shown that the disclosed systems and methods perform well on these datasets, as well as on standard ShapeNet tasks.

In accordance with aspects of the disclosure, a method is provided that includes providing an input image depicting a view of an object to a machine learning model that has been trained based on a constraint of equivariance under rotations between a training object and a model-generated representation of the training object; and generating, using the machine learning model and based on the provided image, at least one of an output image that depicts the object from a rotated view that is different from the view of the object in the image or a three-dimensional representation of the object.

In accordance with aspects of the disclosure, a system is provided that includes a processor; and a memory device containing instructions, which when executed by the processor cause the processor to: provide an input image depicting a view of an object to a machine learning model that has been trained based on a constraint of equivariance under rotations between a training object and a model-generated representation of the training object; and generate, using the machine learning model and based on the provided image, at least one of an output image that depicts the object from a rotated view that is different from the view of the object in the image or a three-dimensional representation of the object.

In accordance with aspects of the disclosure, a non-transitory machine-readable medium is provided including code that, when executed by a processor, causes the processor to: provide an input image depicting a view of an object to a machine learning model that has been trained based on at least two training images depicting different views of a training object; and generate, using the machine learning model and based on the provided image, at least one of an output image that depicts the object from a rotated view that is different from the view of the object in the image or a three-dimensional representation of the object.

In accordance with aspects of the disclosure, a non-transitory machine-readable medium is provided including code that, when executed by a processor, causes the processor to: provide an input image depicting a view of an object to a machine learning model that has been trained based on a constraint of equivariance under rotations between a training object and a model-generated representation of the training object; and generate, using the machine learning model and based on the provided image, at least one of an output image that depicts the object from a rotated view that is different from the view of the object in the image or a three-dimensional representation of the object.

In accordance with aspects of the disclosure, a non-transitory machine-readable medium is provided including code that, when executed by a processor, causes the processor to: provide an input image depicting a view of an object to a machine learning model that has been trained based on a constraint of equivariance under rotations between a training object and a model-generated representation of the training object; and generate, using the machine learning model and based on the provided image, at least one of an output image that depicts the object from a rotated view that is different from the view of the object in the image or a three-dimensional representation of the object.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    providing an input image depicting a view of an object to a machine learning model, wherein the machine learning model utilizes a nearest neighbor shear rotation and has been trained based on a constraint of equivariance under rotations between a training object and a model-generated representation of the training object, the constraint comprising a comparison of a first implicit representation of the training object to a rotated version of a second implicit representation of the training object and a comparison of the second implicit representation to a rotated version of the first implicit representation; and
    generating, using the machine learning model and based on the provided input image, at least one of an output image that depicts the object from a rotated view that is different from the view of the object in the input image, or a three-dimensional representation of the object.

2. The method of claim 1, wherein the machine learning model utilizes:
    inverse rendering; and
    forward rendering.

3. The method of claim 2, wherein generating the at least one of the output image that depicts the object from the rotated view that is different from the view of the object in the input image or the three-dimensional representation of the object comprises generating the at least one of the output image that depicts the object from the rotated view that is different from the view of the object in the input image or the three-dimensional representation of the object with the forward rendering.

4. The method of claim 3, further comprising generating an implicit representation of the object with the inverse rendering based on the input image.

5. The method of claim 4, wherein the forward rendering generates the at least one of the output image that depicts the object from the rotated view that is different from the view of the object in the input image or the three-dimensional representation of the object based on the implicit representation generated by the inverse rendering.

6. The method of claim 5, wherein generating the at least one of the output image that depicts the object from the rotated view that is different from the view of the object in the input image or the three-dimensional representation of the object based on the implicit representation comprises rotating the implicit representation of the object.

7. The method of claim 6, wherein rotating the implicit representation of the object comprises performing the nearest neighbor shear rotation of the implicit representation of the object.

8. The method of claim 7, wherein the three-dimensional representation comprises is an explicit three-dimensional representation including at least one of a voxel grid, a mesh or a point cloud.

9. The method of claim 7, wherein the implicit representation of the object comprises a tensor or a latent space of an autoencoder.

10. The method of claim 4, wherein generating the implicit representation of the object with the inverse rendering based on the input image comprises generating the implicit representation in a single forward pass of the inverse rendering.

11. The method of claim 1, further comprising training the machine learning model based on the constraint of equivariance under rotations between the training object and the model-generated representation of the training object by:
    providing a first input training image depicting a first view of the training object to the machine learning model;
    providing a second input training image depicting a second view of the training object to the machine learning model;
    generating the first implicit representation of the training object based on the first input training image;
    generating the second implicit representation of the training object based on the second input training image;
    rotating the first implicit representation of the training object to generate the rotated version of the first implicit representation;
    rotating the second implicit representation of the training object to generate the rotated version of the second implicit representation;
    generating a first output training image based on the rotated version of the first implicit representation of the training object;
    generating a second output training image based on the rotated version of the second implicit representation of the training object;
    comparing the first input training image to the second output training image; and
    comparing the second input training image to the first output training image.

12. The method of claim 11, wherein the training further comprises minimizing a loss function based on the comparing of the first input training image to the second output training image and the comparing of the second input training image to the first output training image.

13. The method of claim 12, further comprising:
    comparing the first implicit representation to the rotated version of the second implicit representation; and
    comparing the second implicit representation to the rotated version of the first implicit representation.

14. The method of claim 13, wherein the loss function is further based on the comparing of the first implicit representation to the rotated version of the second implicit representation and the comparing of the second implicit representation to the rotated version of first implicit representation.

15. The method of claim 1, further comprising training the machine learning model based on at least two input training images without three-dimensional supervision of the training.

16. The method of claim 15, further comprising testing the trained machine learning model without providing pose information to the trained machine learning model.

17. A system comprising:
a processor;
a memory device containing instructions, which when executed by the processor cause the processor to:
provide an input image depicting a view of an object to a machine learning model, wherein the machine learning model utilizes a nearest neighbor shear rotation and has been trained based on a constraint of equivariance under rotations between a training object and a model-generated representation of the training object, wherein the nearest neighbor shear rotation comprises an invertible shear rotation of an implicit three-dimensional representation of the object in which each voxel of the implicit three-dimensional representation of the object is shifted to a unique nearest neighbor on a grid; and
generate, using the machine learning model and based on the provided input image, at least one of an output image that depicts the object from a rotated view that is different from the view of the object in the input image, or a three-dimensional representation of the object.

18. The system of claim 17, wherein a model architecture of the machine learning model, including a shear rotation module, is fully differentiable.

19. A non-transitory machine-readable medium comprising code that, when executed by a processor, causes the processor to:
provide an input image depicting a view of an object to a machine learning model, wherein the machine learning model utilizes shear rotation and has been trained based on at least two input training images depicting different views of a training object and a constraint of equivariance under rotations, the constraint comprising a comparison of a first implicit representation of the training object to a rotated version of a second implicit representation of the training object and a comparison of the second implicit representation to a rotated version of the first implicit representation; and
generate, using the machine learning model and based on the provided input image, at least one of an output image that depicts the object from a rotated view that is different from the view of the object in the input image, or a three-dimensional representation of the object.

20. The non-transitory machine-readable medium of claim 19, wherein the machine learning model utilizes inverse rendering, and forward rendering.

21. The non-transitory machine-readable medium of claim 19, wherein the machine learning model has been trained based on the at least two input training images without three-dimensional supervision.

* * * * *

UNITED STATES PATENT AND TRADEMARK OFFICE
CERTIFICATE OF CORRECTION

PATENT NO. : 11,967,015 B2
APPLICATION NO. : 17/145232
DATED : April 23, 2024
INVENTOR(S) : Qi Shan et al.

Page 1 of 1

It is certified that error appears in the above-identified patent and that said Letters Patent is hereby corrected as shown below:

On the Title Page

Under Column No. 1, Page 2, Line No. 8 Item (56): "Face_2015 CVPR_paper", should read: --Face_2015_CVPR_paper--;

Under Column No. 2, Page 2, Line No. 2 Item (56): "http:/ai.stanford.cdu/~amaas/", should read: --http://ai.stanford.edu/~amaas/--;

Under Column No. 2, Page 2, Line No. 4 Item (56): "A 3dD Convolutional", should read: --A 3D Convolutional--;

Under Column No. 2, Page 2, Line Nos. 62-64 Item (56): "Xu, et al., "Dcc36cp View Synthesis frc37om Sparse Photometric Images," 2019 ACM Transactions on Graphics, 2019, vol. 38, No. 4, Article 76, 13 pages." should read: --Xu, et al., "Deep View Synthesis from Sparse Photometric Images," 2019 ACM Transactions on Graphics, 2019, vol. 38, No. 4, Article 76, 13 pages.--

Signed and Sealed this
Thirteenth Day of August, 2024

Katherine Kelly Vidal
*Director of the United States Patent and Trademark Office*